US008500545B2

(12) United States Patent
Watkins et al.

(10) Patent No.: US 8,500,545 B2
(45) **Date of Patent: *Aug. 6, 2013**

(54) METHOD, APPARATUS, AND PROGRAM PRODUCT FOR PRESENTING GAMING RESULTS THROUGH INVERSE SYMBOL LOGIC

(75) Inventors: Brian Alexander Watkins, Austin, TX (US); Galen Tanner Svanas, Austin, TX (US)

(73) Assignee: Multimedia Games, Inc., Austin, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/356,310

(22) Filed: Jan. 23, 2012

(65) Prior Publication Data

US 2012/0122548 A1 May 17, 2012

Related U.S. Application Data

(63) Continuation of application No. 11/377,974, filed on Mar. 17, 2006, now Pat. No. 8,100,752.

(60) Provisional application No. 60/716,282, filed on Sep. 12, 2005.

(51) Int. Cl.

| | |
|---|---|
| ***A63F 9/24*** | (2006.01) |
| ***A63F 13/00*** | (2006.01) |
| ***G06F 17/00*** | (2006.01) |
| ***G06F 19/00*** | (2011.01) |

(52) U.S. Cl.
USPC .................................. 463/21; 463/16; 463/20

(58) Field of Classification Search
USPC ............................................................ 463/21
See application file for complete search history.

(56) References Cited

U.S. PATENT DOCUMENTS

| | | | |
|---|---|---|---|
| 4,198,052 | A | 4/1980 | Gauselmann |
| 4,494,197 | A | 1/1985 | Troy et al. |
| 4,838,552 | A | 6/1989 | Hagiwara |

(Continued)

FOREIGN PATENT DOCUMENTS

| | | | |
|---|---|---|---|
| GB | 2 394 591 | A | 4/2004 |
| WO | WO 2004/012833 | A1 | 2/2004 |

OTHER PUBLICATIONS

International Search Report dated Mar. 23, 2007, in PCT application No. PCT/US2006/33889 (3 pages).

(Continued)

*Primary Examiner* — Michael Cuff
*Assistant Examiner* — Kevin Y Kim
(74) *Attorney, Agent, or Firm* — Russell D. Culbertson, Esq.; J P Cody, Esq.

(57) ABSTRACT

A gaming machine displays a number of symbol locations with a respective graphic symbol at each symbol location. Each symbol location is shown on a display system which may comprise a set of mechanical reels or reels simulated on a video display device. The display system is capable of displaying a target symbol or any other one of a number of graphic symbols included in a group of presentation symbols. In response to a first player input, each of the number of symbol locations is caused to conduct a respective symbol change process one or more times to change the graphic symbol included at each respective symbol location. At least some of the awards available in the game are based at least in part on the absence of the target symbol at one or more of the number of symbol locations.

20 Claims, 7 Drawing Sheets

U.S. PATENT DOCUMENTS

| | | | |
|---|---|---|---|
| 5,342,047 | A | 8/1994 | Heidel et al. |
| 5,413,342 | A | 5/1995 | Kaplan |
| 5,704,835 | A | 1/1998 | Dietz, II |
| 5,836,819 | A | 11/1998 | Ugawa |
| 6,033,307 | A | 3/2000 | Vancura |
| 6,089,978 | A | 7/2000 | Adams |
| 6,165,070 | A | 12/2000 | Nolte et al. |
| 6,241,607 | B1 | 6/2001 | Payne et al. |
| 6,270,411 | B1 | 8/2001 | Gura et al. |
| 6,450,883 | B1 | 9/2002 | O'Halloran |
| 6,641,477 | B1 | 11/2003 | Dietz, II |
| 6,666,766 | B2 | 12/2003 | Baerlocher et al. |
| 6,676,511 | B2 | 1/2004 | Payne et al. |
| 6,733,385 | B1 | 5/2004 | Enzminger et al. |
| 2001/0024970 | A1 | 9/2001 | McKee et al. |
| 2003/0078101 | A1 | 4/2003 | Schneider et al. |
| 2003/0144048 | A1 | 7/2003 | Silva |
| 2003/0144052 | A1 | 7/2003 | Walker et al. |
| 2003/0195024 | A1 | 10/2003 | Slattery |
| 2004/0033824 | A1 | 2/2004 | Fitzhugh |
| 2004/0053665 | A1 | 3/2004 | Baerlocher |
| 2004/0087354 | A1 | 5/2004 | Ellis |
| 2004/0152499 | A1 | 8/2004 | Lind et al. |
| 2004/0152505 | A1 | 8/2004 | Herrmann et al. |
| 2005/0119040 | A1 | 6/2005 | Berman et al. |
| 2005/0137010 | A1 | 6/2005 | Enzminger et al. |

OTHER PUBLICATIONS

Written Opinion of the International Search Authority dated Mar. 23, 2007, in PCT application No. PCT/US2006/33889 (4 pages).

METHOD, APPARATUS, AND PROGRAM PRODUCT FOR PRESENTING GAMING RESULTS THROUGH INVERSE SYMBOL LOGIC

CROSS-REFERENCE TO RELATED APPLICATIONS

The Applicants claim the benefit, under 35 U.S.C. §120, of U.S. patent application Ser. No. 11/377,974 filed Mar. 17, 2006, and entitled "METHOD, APPARATUS, AND PROGRAM PRODUCT FOR PRESENTING GAMING RESULTS THROUGH INVERSE SYMBOL LOGIC," now U.S. Pat. No. 8,100,752 B2.

The Applicants also claim the benefit, under 35 U.S.C. §119(e), of U.S. Provisional Patent Application Ser. No. 60/716,282 filed Sep. 12, 2005, and entitled "METHOD, APPARATUS, AND PROGRAM PRODUCT FOR PRESENTING GAMING RESULTS THROUGH INVERSE SYMBOL LOGIC," priority from which was also claimed in U.S. patent application Ser. No. 11/377,974.

The entire content of each of these prior applications is incorporated herein by this reference.

A portion of the disclosure of this patent document contains material which is subject to copyright protection. The copyright owner has no objection to the facsimile reproduction by anyone of the patent document or the patent disclosure, as it appears in the U.S. Patent and Trademark Office patent file or records, but otherwise reserves all rights of copyright.

TECHNICAL FIELD OF THE INVENTION

This invention relates to gaming machines and systems. More particularly, the invention relates to methods for presenting gaming results to a player through a graphic display in which the award to the player is affected by the absence of one or more symbols in the graphic display, that is, by inverse symbol logic. The invention also encompasses a gaming apparatus and program product for implementing the presentation method.

BACKGROUND OF THE INVENTION

A large number of different gaming machines have been developed to provide various formats and graphic presentations for conducting games and presenting game results. For example, numerous mechanical reel-type gaming machines, also known as slot machines, have been developed with different reel configurations, reel symbols, and paylines. More recently, gaming machines have been developed with video monitors that are used to produce simulations of mechanical spinning reels. These video-based gaming machines may use one or more video monitors to provide a wide variety of graphic effects in addition to simulated spinning reels, and may also provide secondary/bonus games using different reel arrangements or entirely different graphics. Video-based gaming machines may also be used to show card games or various types of competitions such as simulated horse races in which wagers may be placed. Game manufacturers are continuously pressed to develop new game presentations, formats, and game graphics in an attempt to provide high entertainment value for players and thereby attract and keep players.

SUMMARY OF THE INVENTION

The present invention includes a highly entertaining method of presenting gaming results through an array of graphic symbol locations through which one or more paylines are defined. The entertainment value is achieved by providing a bonus award feature that serves to increase the payout for a payline win without conducting a separate bonus game. Entertainment value is also enhanced in methods according to the invention by allowing the graphic symbols at some symbol locations to change multiple times before reaching a final symbol. The present invention also encompasses both a gaming apparatus and program products for implementing methods according to the invention.

A method embodying principles of the invention may be implemented using one or more display devices such as CRTs, LCDs, plasma displays, or other types of display devices. The display device or devices used to show graphic elements according to the invention will commonly be associated with a gaming machine through which a player may participate in a game which generates results which are to be presented to the player in some fashion. Alternatively, the present invention may be implemented with a gaming machine that includes a mechanical reel arrangement to show the various graphic elements. As used in this disclosure and the accompanying claims, a gaming machine through which the present invention may be implemented will be referred to generally as a player station.

One preferred method according to the invention displays a number of symbol locations with a respective graphic symbol at each symbol location. Each symbol location may comprise an actual reel or simulated reel which is capable of displaying any one of a number of graphic symbols included in a group of presentation symbols. This group of presentation symbols includes a target symbol. In response to a first player input, each of the number of symbol locations is caused to conduct a respective symbol change process one or more times to change the graphic symbol included at each respective symbol location to a respective one of the graphic symbols included in the group of presentation symbols. Where the symbol locations are shown by actual or simulated reels, the symbol change process involves causing the reels to spin or appear to spin. Regardless of specifically how the symbol change process at each symbol location is conducted, the symbol locations all ultimately stop at the end of a game cycle to show a respective graphic symbol included in the group of presentation symbols, and an award may be presented to the player at the end of the game cycle depending upon the particular graphic symbols shown at the various symbol locations. According to the invention, at least some of the awards available in the game are based at least in part on the absence of the target symbol at one or more of the number of symbol locations. Thus, an award presented in the game may not be entirely based on an arrangement of the various graphic symbols along a payline defined through the number of symbol locations. Considering the absence of the target symbol at the symbol locations in addition to regular payline wins in identifying the award provides a convenient way to show a bonus without having to provide a separate bonus presentation.

One preferred implementation of the invention uses a triangular arrangement of actual or simulated reels to provide a bowling theme. In this preferred implementation, the number of symbol locations is displayed in an equilateral triangle configuration including one row of four symbol locations, one row of three symbol locations, one row of two symbol locations, and one row of one symbol location. This configuration uses the symbol locations to show a configuration often bowling pin locations. Prior to the start of the game cycle, the invention preferably includes resetting all of the symbol locations to show the target symbol, which comprises a graphic representation of a bowling pin. In this form of the invention, causing each of the number of symbol locations to conduct the respective symbol change process includes performing a first game cycle component in which each of the number of symbol locations conduct a respective symbol change process. That is, upon receipt of the player input to initiate the game cycle, the actual or simulated reels are caused to spin and then stop to show apparently random graphic symbols selected from the group of presentation symbols. This part of the game cycle is analogous to throwing the first ball of a bowling frame. After the actual or simulated reels are caused to spin and come to rest the first time in the game cycle, this implementation of the invention includes performing a second game cycle component. In this second game cycle component, each of the symbol locations displaying the target symbol (a bowling pin representation) after completion of the first game cycle component conducts another respective symbol change process. That is, all of the symbol locations showing a bowling pin representation after the first spin are each caused to respin and then stop to show a new, apparently random, graphic symbol selected from the group of presentation symbols. This second spin is analogous to throwing the second ball of a bowling frame.

It will be appreciated that if none of the symbol locations show a target symbol (bowling pin representation) after the first spin in this implementation of the invention, the result of the first spin is analogous to a strike in bowling. If none of the symbol locations show a target symbol (bowling pin representation) after the second spin, the result of the second spin is analogous to a spare in bowling. If a target symbol/bowling pin representation appears at any of the symbol locations after the second spin, the result is analogous to an open frame in bowling. The award presented for a play in the game may be affected by whether the player achieved a strike or a spare, that is, the game cycle award may be at least partially based on the absence of the target symbol/bowling pin representation at any of the symbol locations after the game cycle is complete. At least part of the award may be attributed to achieving a strike or a spare in the game cycle and at least part of the award may be based upon achieving a win along one or more paylines defined through the symbol locations.

An apparatus embodying the principles of the present invention includes a display device, a player input device, and a presentation controller, all preferably associated with a player station. The presentation controller causes the display device to display the number of symbol locations and receives a first player input entered through the player input device to initiate a game cycle. The presentation controller also causes the display device to display a respective symbol change process one or more times for each of the number of symbol locations. At the end of a game cycle, the presentation controller causes the display device to display an award that may be based at least in part on the absence of the target symbol at one or more of the symbol locations.

The result presented to a player as an award according to the invention may be obtained in any suitable fashion. In some forms of the invention, the apparatus may receive results identified from a separate device or system. Particularly in these forms of the invention, the result may actually be a result from an electronic lottery game, a bingo game, or some other game. In other forms of the invention, a result controller may be included at the player station and adapted to communicate a game play result to the presentation controller in response to a result requesting input entered through the input device. Because a result that may be presented to a player according to the present invention may be identified from a game such as a lottery game or bingo game, for example, the player seeing results presented according to the invention may in fact be playing a lottery game or bingo game. A "play" or "game play" referenced in this disclosure will refer to the game cycle of a graphic presentation according to the invention regardless of the particular game used to identify a result to be awarded to the player.

A program product embodying the principles of the invention is stored on one or more computer readable devices and preferably includes initial symbol control program code, player interface program code, symbol change control program code, and award display program code. The initial symbol control program code is executable to cause a display device to display a number of symbol locations as described above. The player interface program code is executable to receive a player input to initiate a game cycle according to the invention. The symbol change control program code is executable to cause the display device to display the symbol change process at each of the symbol locations. The award display program code is executable to cause the display device to display the award.

These and other advantages and features of the invention will be apparent from the following description of preferred embodiments, considered along with the accompanying drawings.

DESCRIPTION OF PREFERRED EMBODIMENTS

The claims at the end of this document set out novel features which the Applicants believe are characteristic of the invention. The various advantages and features of the invention together with preferred modes of use of the invention will best be understood by reference to the following description of illustrative embodiments read in conjunction with the drawings introduced above.

Figure 1:
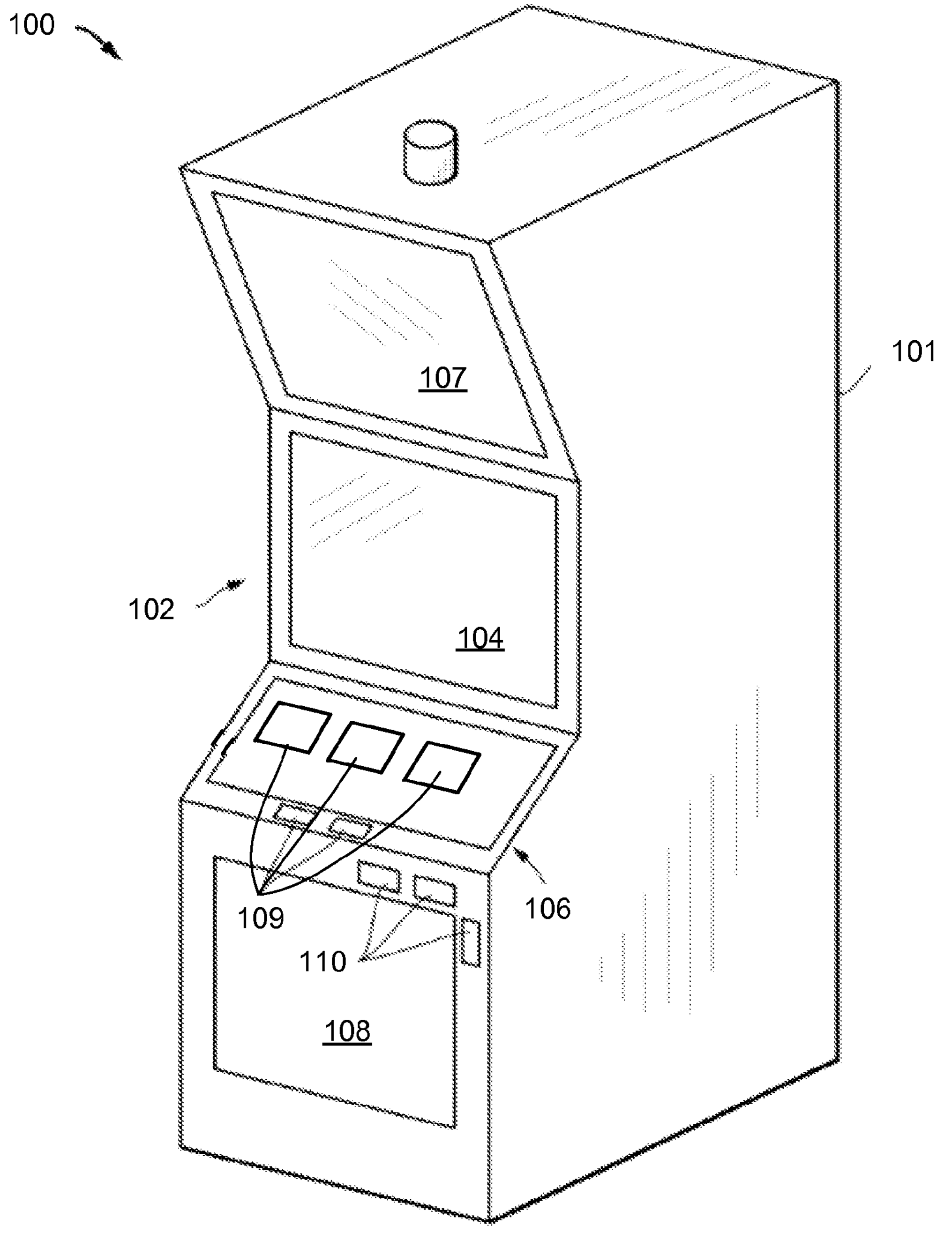
FIG. 1 is a perspective view of a player station that may be used to implement a game presentation according to the invention.
Figure 2:
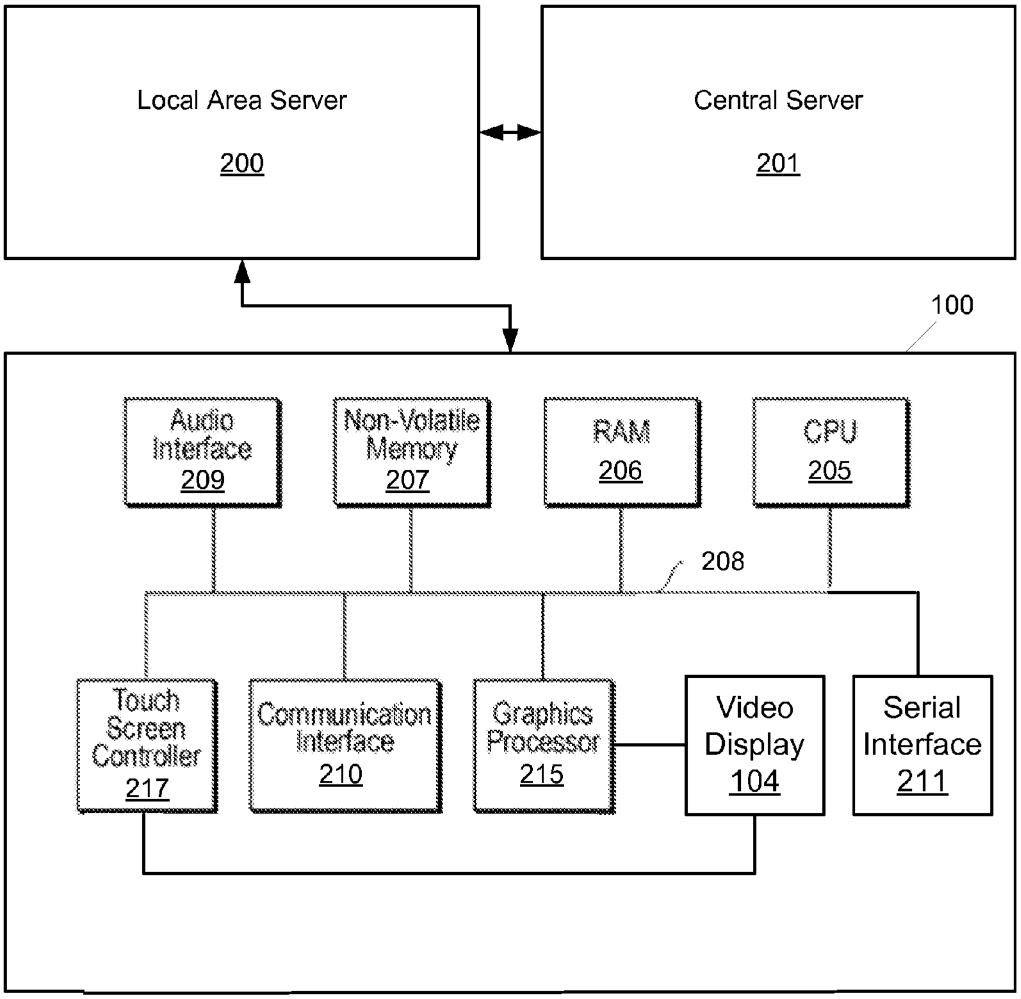
FIG. 2 is a diagrammatic representation of a player station and gaming system that may be used to implement methods according to the present invention.

FIG. 1 shows a player station 100 that may be used to implement game presentations according to the present invention. The block diagram of FIG. 2 shows further details of player station 100 connected in a gaming system in which the present invention may be used to present gaming results to players.

Referring to FIG. 1, a player station 100 includes a cabinet 101 having a front side generally shown at reference numeral 102. A video display device 104 is mounted in a central portion of the front surface 102, with a ledge 106 positioned below the video display device and projecting forwardly from the plane of the video display device. In addition to the video display device 104, the illustrated player station 100 includes a top glass display 107 positioned above the video display device, and a belly glass display 108 positioned below the video display device. In the illustrated player station 100, video display device 104 is used to produce the graphic components making up the game presentation according to the invention. That is, video display device 104 displays the symbol locations and graphic symbols contained in those locations, displays the change processes shown at the symbol locations, and also displays the symbols that correlate to the player's award for a game play. In player station 100, top glass display 107 and bottom glass display 108 contain static graphics related to the particular game presentation. For example, top glass display 107 may show a paytable such as the paytable described below in connection with FIG. 5. Bottom glass display 108 may show additional graphics related to the graphics shown at top glass display 107 and video display device 104.

Player station 100 illustrated in FIG. 1, includes mechanical player control buttons or other input devices 109 mounted on ledge 106. Other forms of the invention may include switches, joysticks, or other player input devices mounted on ledge 106.

It will be appreciated that player stations may also include player interface devices in addition to devices that are considered player controls for use in playing a particular game. Player station 100 also includes additional player interface devices 110 on a lower portion of cabinet 101 generally in the plane of bottom glass display 108. These additional player interface devices 110 may comprise for example, a player card reader, a voucher or ticket reader/issuer, a currency acceptor/validator, and/or a coin or a token acceptor/dispenser.

It should be noted that the present invention is by no means limited to implementation with the single video display device player station 100 shown in FIG. 1. A game presentation made according to the present invention may be produced with any player station that includes a player interface for enabling a player to make direction inputs, and one or more video display devices, or physical reel arrangements through which the various graphic elements of the game presentation may be produced. Player station 100 is merely shown as an example of a player station through which the invention may be implemented. Other player stations implementing the present invention may include other types of devices that may show game play results. For example, a player station may include a spinning wheel to show results, or one or more physical reels. These result display devices may be used to show some gaming results to the player, while the presentation according to the invention may be used to show other results. It should also be noted that the video display device 104 used in player station 100, or some other player station that may be used to implement the invention, may comprise any suitable video display device including a cathode ray tube, liquid crystal display, plasma display, LED display or any other type of video display currently known or that may be developed in the future.

FIG. 2 provides a block diagram showing various components of player station 100 together with gaming system components external to the player station. In particular, FIG. 2 shows player station 100 connected for communication with a local area server 200 and a central server 201. Local area server 200 and central server 201 may be used together with player station 100 and other player stations to implement a bingo gaming system, such as the bingo gaming system described in U.S. patent application publication No. 2004-0152499-A1, or to implement a lottery gaming system such as the lottery gaming systems shown in U.S. patent application publication No. 2005-0137010 A1 or U.S. Pat. No. 6,733,385, for example. Regardless of the precise manner in which results are identified in a given system, local area server 200 and central server 201, or both servers, may cooperate to identify results that are provided to player station 100 in response to a result requesting input entered at the player station. That is, local area server 200 and/or central server 201, or more particularly, one or more processing devices associated with server 200 and/or server 201 may serve as a result controller for identifying results used by player station 100 as described further below with reference to FIG. 3. Even in implementations in which results are produced at the player station 100 in some fashion, local area server 200 and/or central server 201 may be used to provide player tracking and accounting services for the player stations included in the gaming system.

The player station 100 shown in FIG. 2 includes a central processing unit (CPU) 205 along with random access memory 206 and nonvolatile memory or storage device 207. All of these devices are connected on a system bus 208 with an audio interface device 209, communications interface 210, and a serial interface 211. A graphics processor 215 is also connected on bus 208 and is connected to drive the video display device 104 (mounted on cabinet 101 as shown in FIG. 1). As shown in FIG. 2, player station 100 also includes a touch screen controller 217 connected to system bus 208. Touch screen controller 217 is also connected to receive signals from a touch screen element associated with video display device 104. It will be appreciated that the touch screen element itself comprises a thin film that is secured over the display surface of video display device 104. The touch screen element itself is not illustrated or referenced separately in the figures.

Those familiar with data processing devices and systems will appreciate that other basic components will be included in player station 100 such as a power supply, cooling systems for the various system components, audio amplifiers and speakers, and other devices that are common in gaming machines. These additional devices are omitted from the drawings so as not to obscure the present invention in unnecessary detail.

All of the elements 205, 206, 207, 208, 209, 210, and 211 shown in FIG. 2 are elements commonly associated with a personal computer. These elements are preferably mounted on a standard personal computer chassis and housed in a standard personal computer housing which is itself mounted in cabinet 101 shown in FIG. 1. Alternatively, the various electronic components may be mounted on one or more circuit boards housed within cabinet 101 without a separate enclosure such as those found in personal computers. Those familiar with data processing systems and the various data processing elements shown in FIG. 2 will appreciate that many variations on this illustrated structure may be used within the scope of the present invention. For example, since serial communications are commonly employed from a touch screen element secured over a video display surface, a system according to the invention may not include a separate touch screen controller 217. Rather, communications from the touch screen elements may be accommodated through any suitable peripheral interface such as a USB controller or an IEEE 1394 controller. Thus, the connections shown from touch screen controller 217 to the various display devices may alternatively run from the video display device 104 (or more precisely the touch screen element associated with the video display device) to serial interface 211 or any other suitable interface. Numerous other variations in the player station internal structure and system may be used in accordance with the principles of the present invention.

It will also be appreciated that graphics processors are also commonly a part of modern computer systems. Although separate graphics processor 215 is shown for controlling video display device 104, it will be appreciated that CPU 205 may control the video display device directly without any intermediate graphics processor. The invention is not limited to any particular arrangement of graphics processors for controlling the gaming machine display.

In the illustrated player station 100, CPU 205 executes software which ultimately controls the entire player station including the receipt of player inputs and the presentation of the graphic symbols at the various symbol locations displayed according to the invention through the video display device 104 associated with the player station. Thus, CPU 205 either alone or in combination with graphics processor 215 serves as a presentation controller according to the invention. Where the player station 100 itself produces results for a player, CPU 205 also serves as a result controller. CPU 205 also executes software related to communications handled through communications interface 210, and software related to various peripheral devices such as those connected to the system through audio interface 209, serial interface 211, and touch screen controller 217. CPU 205 may also execute software to perform accounting functions associated with game play. Random access memory 206 provides memory for use by CPU 205 in executing its various software programs while the nonvolatile memory or storage device 207 provides storage for programs not in use or for other data generated or used in the course of player station operation. Communications interface 210 provides an interface to other components of a gaming system that may be involved in game play, such as local area server 200 and/or central server 201.

It should be noted that the invention is not limited to player stations employing the personal computer-type arrangement of processing devices and interfaces shown in example player station 100. Other player stations may include one or more special purpose processing devices to perform the various processing steps for implementing the present invention. Unlike general purpose processing devices such as CPU 205, these special purpose processing devices may not employ operational program code to direct the various processing steps.

Figure 3:
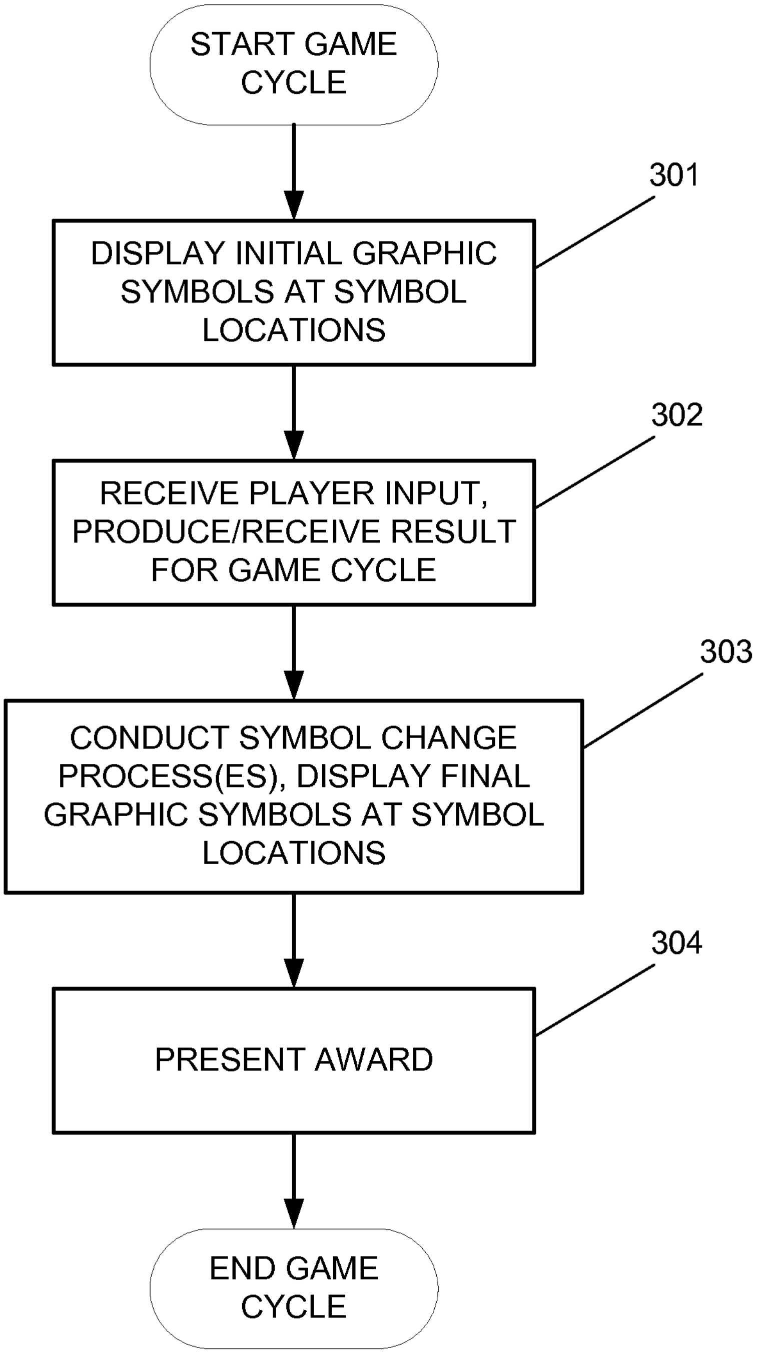
FIG. 3 is a flow chart showing a method embodying the principles of the present invention.

FIG. 3 comprises a process flow chart showing a complete game cycle according to one preferred form of the present invention. As indicated at process block 301, the process begins with displaying initial graphic symbols at a number of symbol locations. After this initial display, a player input is received as indicated at process block 302. In response to the player input, each symbol location is caused to conduct a respective symbol change process as indicated at process block 303. A given symbol location may conduct one or more respective symbol change processes to change the graphic symbol shown at the respective symbol location. At the conclusion of the step indicated at process block 303, each symbol location shows a respective graphic symbol included in a group of presentation symbols. As indicated at process block 304, the method includes presenting an award based at least in part on the absence of a target symbol at one or more of the symbol locations.

The step indicated at process block 301 in FIG. 3 preferably includes displaying the various symbol locations in an initial condition in which each symbol location shows a predefined initial graphic symbol. Furthermore, some preferred forms of the invention display the same graphic symbol at each symbol location in this initial condition. As will be described in detail below with a bowling theme example game, the graphic symbol displayed at each symbol location in the initial condition may comprise a graphic representation of a bowling pin, which also comprises the target symbol upon which the award is based.

The player input received as indicated at process block 302 in FIG. 3 may be received in any suitable manner. In some preferred forms of the invention, once the symbol locations are all shown in the initial position, the player is prompted to push a play button at the player station, or pull a play handle, or actuate some other play initiating control at the player station. The player input may also require some other input, such as a wager selection input. For example, one preferred implementation of the invention may produce the initiating player input received as shown at 302 in FIG. 3 only after a player selects from among different wager options at the player station and then actuates a "play" control.

A process according to the present invention may also receive or produce a result for the game cycle at the point of the process indicated at process block 302. For example, the player input may prompt the player station to request a result from a result controller at the player station or elsewhere in the gaming system (such as components 200 or 201 in FIG. 2). The result controller then communicates back a result for the game cycle. The result or data included in or correlating to the result may then be used at the player station to control the video display produced at the player station. In particular, the player station ultimately displays an arrangement of graphic symbols consistent with the result that has been assigned for the game cycle. It will be appreciated, however, that a result may be received at some point in the process other than the point indicated at process block 302. For example, a result may be acquired each time the initial display is produced as shown at block 301, or perhaps even before that point. Alternatively, a result for the game cycle may be obtained while the process is conducting the symbol change processes as indicated at process block 303. It should also be noted that the invention is not limited to applications where a result is obtained and the graphics are forced to correspond to that result. Rather, the symbol change processes indicated at process block 303 may be the processes that dictate the result for the game cycle. That is, the process may use some random or pseudo-random process to select the graphic symbols ultimately displayed at the various symbol locations to dictate the result for the game cycle.

There are numerous ways to conduct the symbol change process for each symbol location as indicated at process block 303 in FIG. 3. In one preferred form of the invention, each symbol location correlates to an actual or simulated reel position. In this case, the symbol change process for a respective symbol location may comprise spinning the reel (or simulating a spin) and then stopping the reel or simulated reel to show either the same or a different graphic symbol. It should be appreciated, however, that the invention is not limited to this reel or simulated reel symbol change process. The invention encompasses any process by which an initial graphic symbol shown at a given symbol location may be changed (or caused to appear to change) and result in the same or a different graphic symbol included in the group of presentation symbols used in the game. It should also be noted that a symbol change process may be conducted multiple times at a given symbol location. The bowling theme example described below with reference to FIGS. 4, 6, and 7 uses a maximum of two symbol changes processes for a given symbol location. Other forms of the invention may employ more than two symbol change processes for a given symbol location and given game cycle.

The process of presenting the award as shown at process block 304 in FIG. 3 preferably includes controlling the display at the player station in some fashion to show a prize that has been won by the player for the respective game cycle. This prize display may include showing a numerical prize value or showing a graphic representation of a prize amount or a tangible prize. Presenting the award to the player may further include crediting an account for the player, issuing a voucher or ticket for the prize amount, or issuing coins, currency, or tokens for the prize amount. In any event, the award is at least partially based on the absence of the target symbol at one or more of the symbol locations.

In forms of the invention implemented through general purpose processing devices such as the devices shown in the example player station 100 of FIG. 2, the various steps shown in FIG. 3 are performed under the control of operational program code. One preferred form of the invention executes initial symbol control program code to cause a display device such as video display device 104 in FIGS. 1 and 2 to display the symbol locations in their initial state as indicated at block 301 in FIG. 3. Player interface program code is executed to receive the player input as shown at process block 302 in FIG. 3. Symbol change program code may be executed to cause the video display device (104 in FIGS. 1 and 2) to show the respective symbol change process at the various symbol locations. The symbol change program code may also be responsible for ensuring that the graphic symbols displayed at the various symbol locations are consistent with a result for the game cycle. Award display program code may be executed to cause the video display device (104 in FIGS. 1 and 2) to display the award. Some forms of the invention may also execute result identifying program code to identify a game play result for the game cycle. This result identifying program code may be executed at the player station or at a processing device remote to the player station such as a processing device included at one of the components 200 and 201 shown in FIG. 2.

Figure 4:
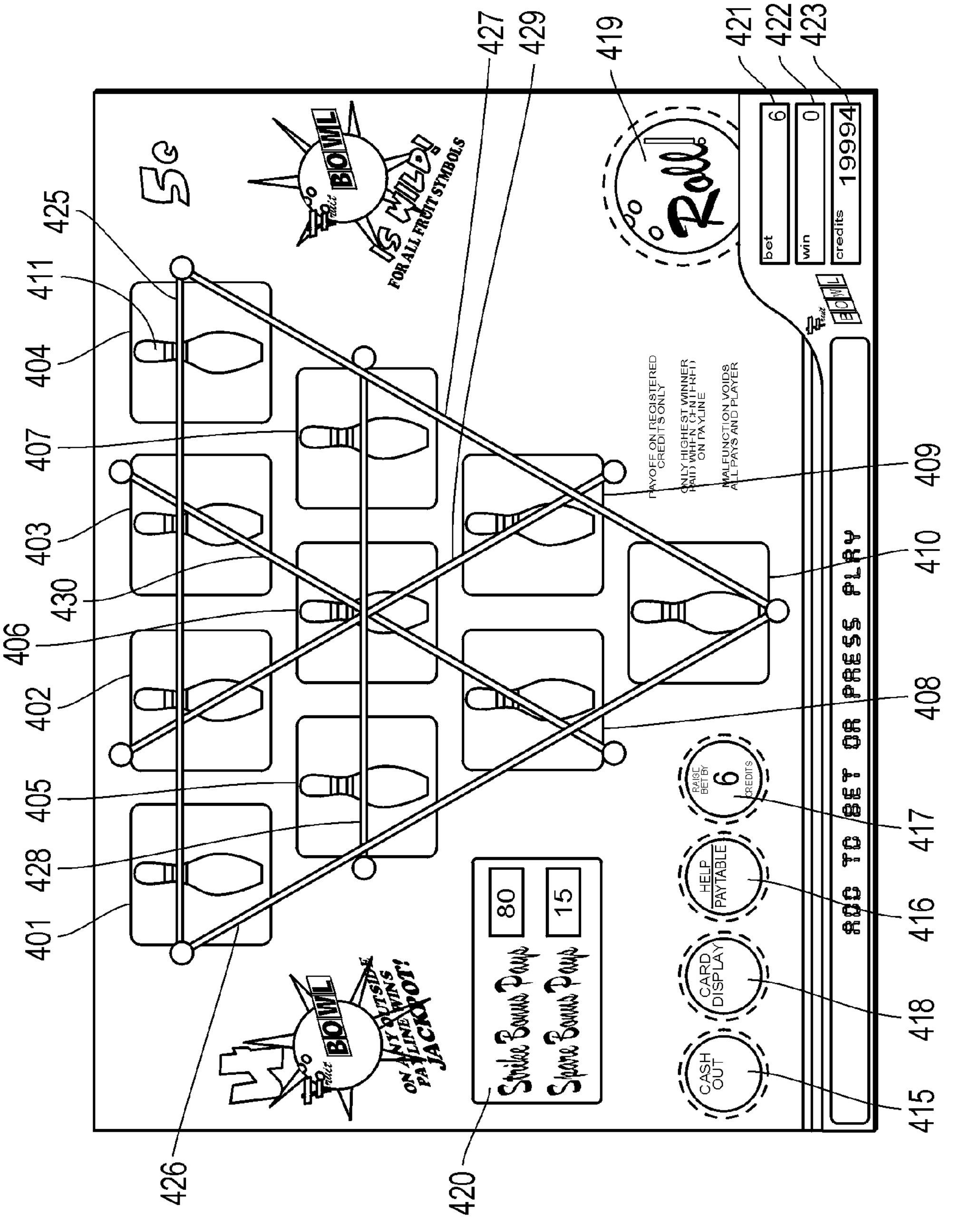
FIG. 4 is a representation of a graphic display that may be generated at the start of a game cycle according to the present invention.
Figure 5:
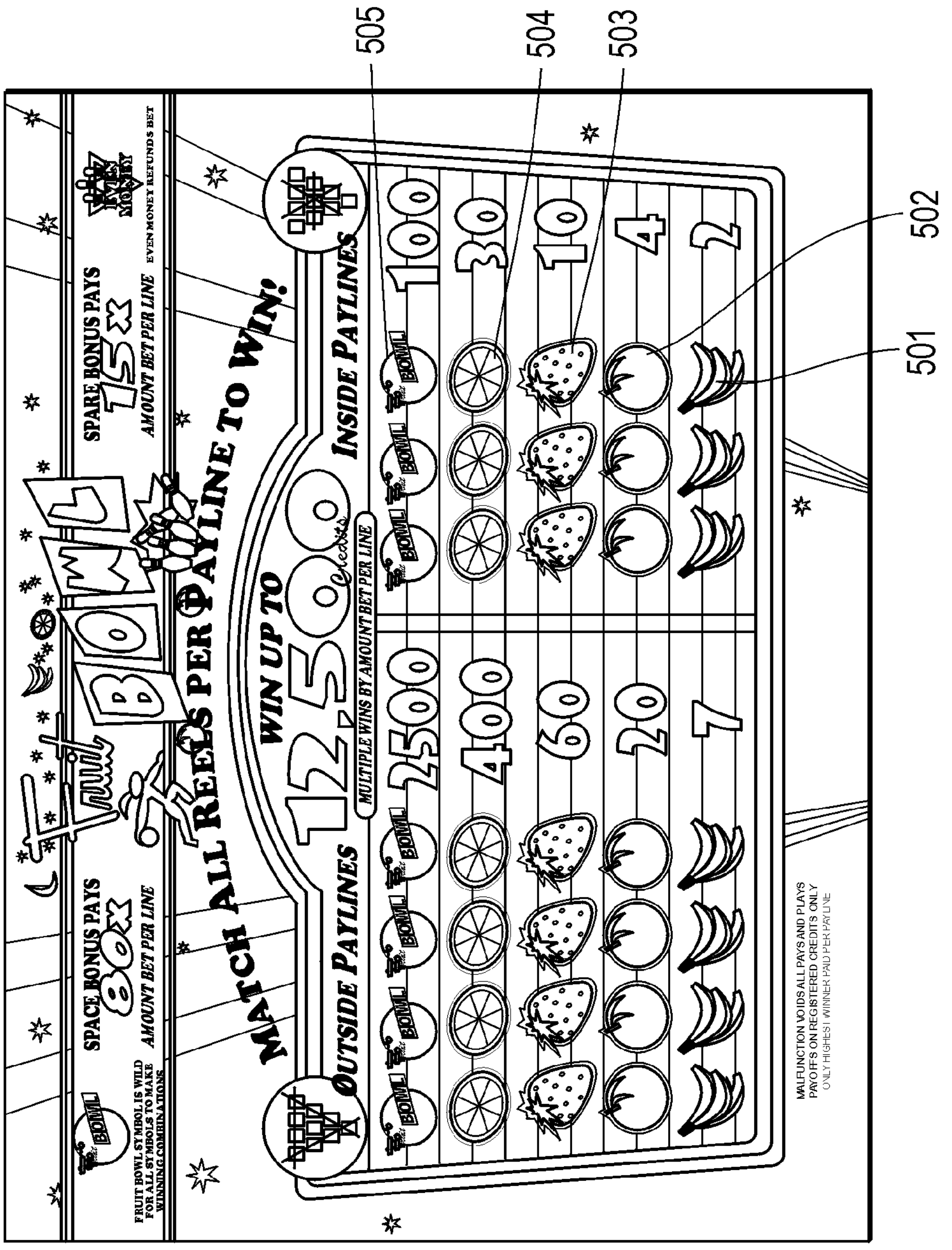
FIG. 5 is a representation of a paytable that may be used to correlate arrangements of graphic symbols with various prizes in the graphic display shown in FIG. 4.
Figure 6:
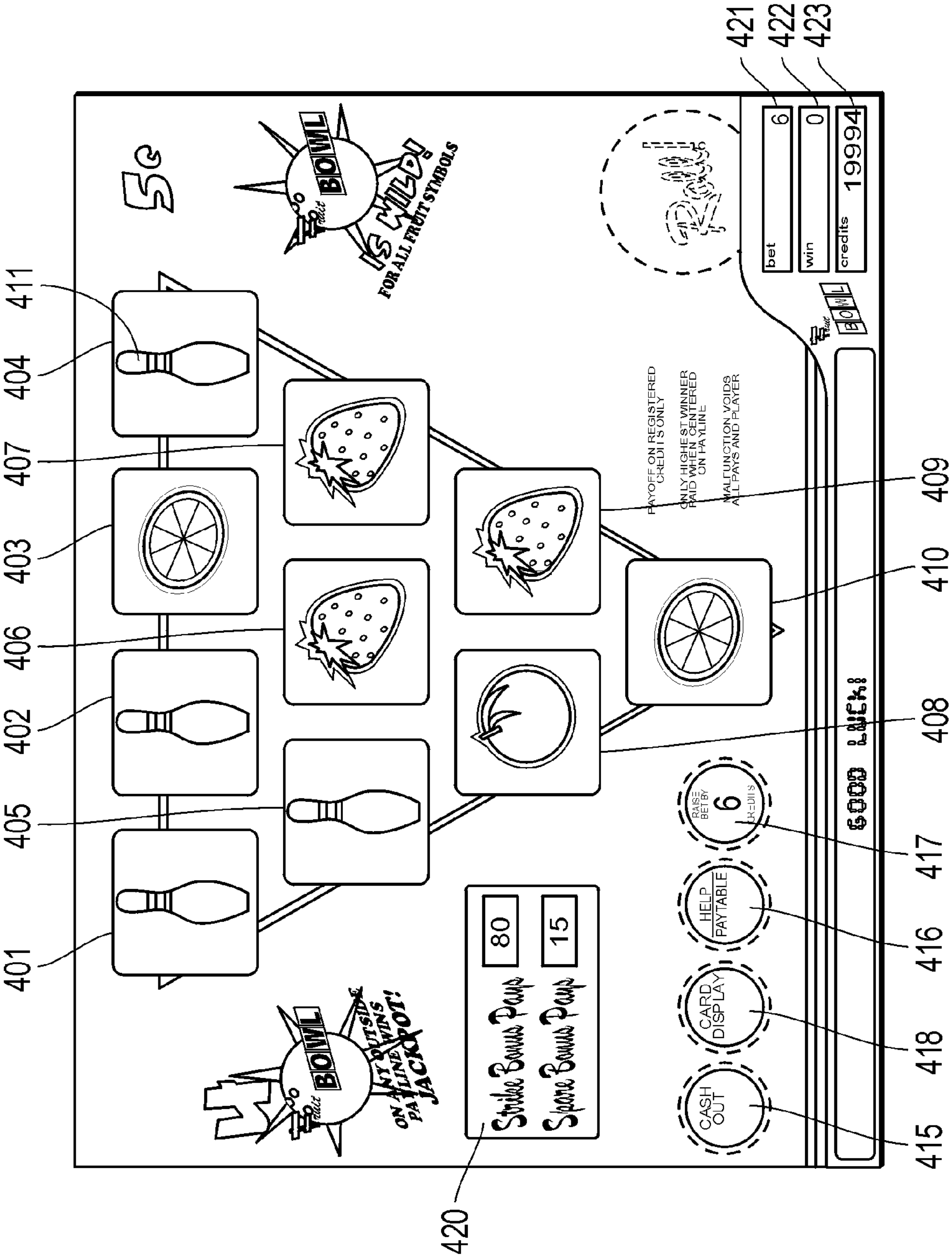
FIG. 6 is a representation of a graphic display that may be generated after completion of a first component of a game cycle according to the present invention.
Figure 7:
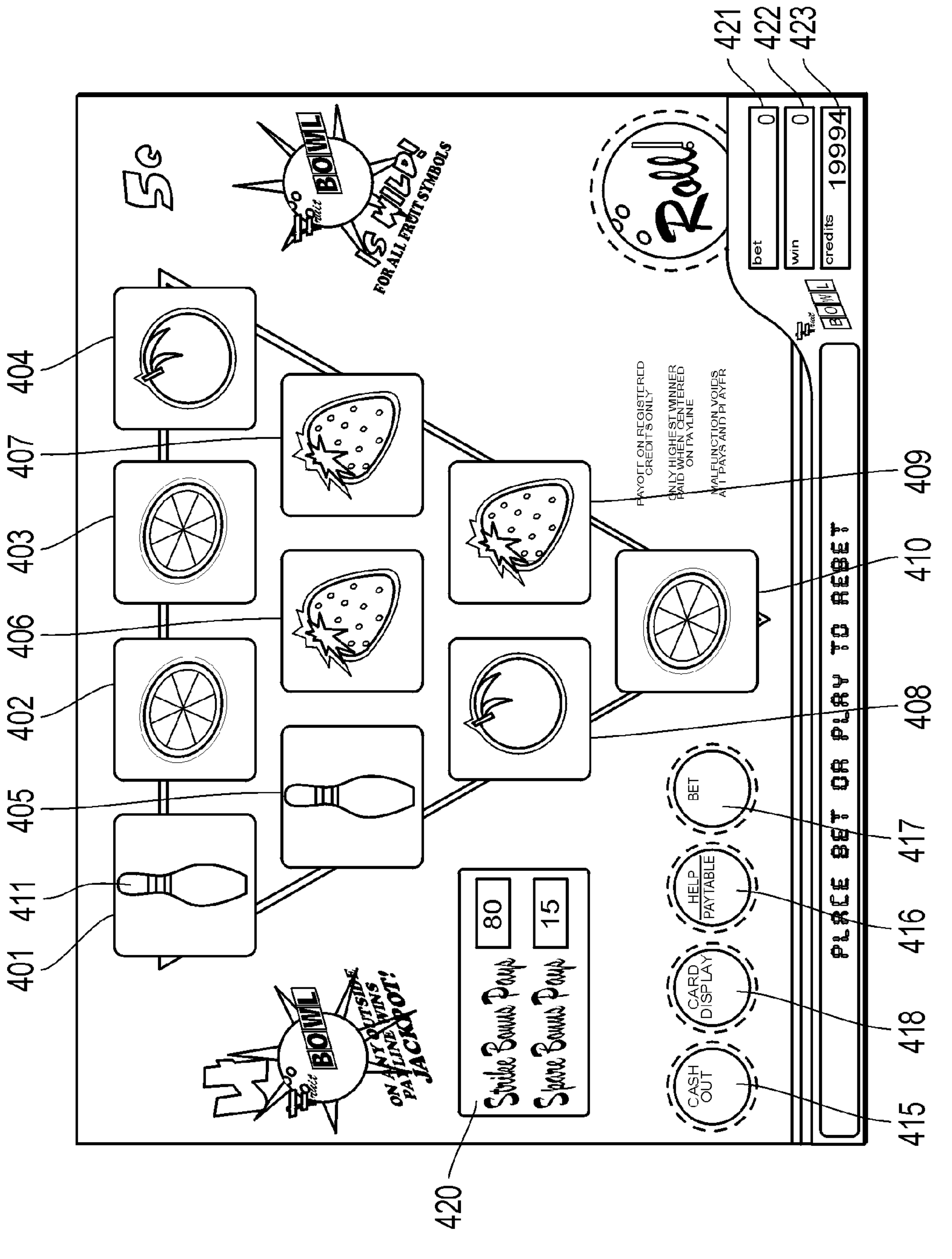
FIG. 7 is a representation of a graphic display that may be generated after completion of a second component of a game cycle according to the present invention.

FIGS. 4, 6, and 7 show a representation of a graphic display (game presentation) that may be produced in a method embodying the principles of the invention. FIG. 5 shows a representation of a paytable that may be employed to correlate arrangements of graphic symbols with various prizes for the graphic display shown in FIGS. 4, 6, and 7. The graphic display shown in FIGS. 4, 6, and 7 may be produced on the video display device 104 associated with player station 100 described above and shown in FIGS. 1 and 2. This particular form of the invention includes a bowling theme with ten symbol locations arranged in an equilateral triangle configuration. One row of symbol locations includes four symbol locations 401, 402, 403, and 404, the next row includes the three symbol locations 405, 406, and 407, the next row includes the two symbol locations 408 and 409, and the final row includes the single symbol location 410. This symbol location field defines six separate paylines, three paylines made up of four symbol locations each, and three paylines made up of three symbol locations each. The following chart shows the symbol locations included in each payline defined in this particular implementation.

| Payline No. | Symbol Locations |
|---|---|
| 1 (425 in FIG. 4) | 401, 402, 403, 404 |
| 2 (426 in FIG. 4) | 401, 405, 408, 410 |
| 3 (427 in FIG. 4) | 404, 407, 409, 410 |
| 4 (428 in FIG. 4) | 405, 406, 407 |
| 5 (429 in FIG. 4) | 402, 406, 409 |
| 6 (430 in FIG. 4) | 403, 406, 408 |

The group of presentation symbols from which graphic symbols may be selected for display at each symbol location are shown best in the paytable of FIG. 5. In addition to the bowling pin symbol 411 (target symbol) shown in FIG. 4, the groups of presentation symbols include a representation of bananas 501, an orange 502, a strawberry 503, and a lime 504. The group of presentation symbols also includes a special symbol 505.

The graphic display shown in FIG. 4 further includes a series of touch screen controls including a cash out button 415, help/paytable button 416, and a raise bet button 417. This particular display shown in FIGS. 4, 6, and 7 is designed specifically for showing game results identified through the play of bingo games. Thus, a card display button 418 is included in this implementation to cause the display to show a bingo card used in identifying a given result. This implementation also includes a roll button 419 which may be activated to produce an initial player input according to the process described above in connection with FIG. 3. It will be appreciated that each of these touchscreen implemented player controls may alternatively or additionally be implemented as mechanical buttons such as buttons 109 in the player station 100 shown in FIG. 1. The illustrated graphic display also includes a spare/strike bonus graphic 420 which indicates the strike and spare bonuses as will be described further below. Other elements of the graphic display include areas 421, 422, and 423 to show the current bet, a win amount, and a total credit amount, respectively.

FIG. 4 shows the initial symbol arrangement for a game cycle in this bowling theme implementation. In this initial symbol arrangement, each symbol location 401 through 410 is controlled to display the target symbol, that is, the graphic representation of a bowling pin 411. Thus, the symbol locations imitate the initial setup of bowling pins in the game of ten-pin bowling. From this initial condition, the player actuates a suitable control to produce a first player input in the game. This input may be made by placing a bet (by touching raise bet button 417 one or more times) and then touching roll button 419 on the touchscreen display. The player station producing the graphic display shown in FIG. 4 may be controlled at this point to produce a sound to simulate a bowling ball rolling down a bowling lane. The sound of a bowling ball hitting pins may then be produced as the various symbol locations each start conducting a respective symbol change process, that is, start spinning in this embodiment.

In the preferred implementation, each symbol location eventually stops spinning to show one of the graphic symbols included in the group of presentation symbols. Each symbol location may show one of the fruit symbols 501-504, the special symbol 505, or the bowling pin symbol 411. The particular example shown in FIG. 6 shows fruit symbols at symbol locations 403 and 406-410, and bowling pin symbols 411 at locations 401, 402, 404, and 405. It will be appreciated that partial results for the game cycle will be apparent at this point in the game cycle. For example, there may be a payline win on one or more of the paylines defined through the symbol locations. The payline wins for this example implementation are shown in the paytable of FIG. 5. Also, if no symbol location shows a bowling pin, the player is entitled to a strike bonus. The amount of this bonus may be shown in the spare/strike bonus area 420. In one preferred implementation a strike is worth 80 times the bet the player has placed per line in the game cycle, however, the invention is not limited to any particular prize amount or prize type for the award. In any event, it will be noted that when a strike occurs a portion of the player's award is based on the absence of the target bowling pin symbol 411 at any of the symbol locations 401-410.

Once the symbol change process begun in response to the first player input has stopped for all symbol locations, the resulting graphic symbols at the various symbol locations 401-410 temporarily remain static in this intermediate condition shown in FIG. 6. Eventually, all of the symbol locations showing bowling pin symbols after the first spin begin a second symbol change process for the game cycle. This second symbol change process may be automatic after a certain delay in the intermediate condition shown in FIG. 6, or may be in response to a second player input entered at the player station. In any event, the player station implementing the display preferably provides an audio representation of a bowling ball rolling down a bowling lane and then symbol locations that conduct a second symbol change process eventually stops to show one of the graphic symbols included in the group of presentation symbols. An example final condition of the symbol locations is shown in FIG. 7. In this example, all of the symbol locations show fruit symbols except symbol locations 401 and 405, which show the target symbol, the bowling pin representation 411. It will be appreciated that the final award to the player will be apparent from the graphic symbols shown at the symbol locations 401-410 in the final condition of the display. Any payline wins will be apparent from the graphic symbols lined up along the paylines. If no bowling pin symbols are present at any of the symbol locations, the player is entitled to a spare bonus. In this preferred implementation, the spare bonus comprises an amount 15 times the amount of the per line bet for the game cycle. As with the award for a strike in the first game cycle component, this award for a spare at the end of the second game cycle component is based on the absence of the target symbol, in this case the bowling pin representation at any of the symbol locations in the display. It will be noted that in the example final condition of the display shown in FIG. 7, and considering the paytable shown in FIG. 5, no payline win has occurred also, no strike or spare bonus has been awarded.

The example display shown in FIGS. 4, 6, and 7, and the paytable shown in FIG. 5, are shown only as convenient examples for describing the principles of the invention. Many variations on these basic examples may be employed within the scope of the present invention. In particular, the invention is not limited to any particular manner for displaying the symbol locations, or to any particular symbols. In particular, numerous different graphic elements may be selected for inclusion in a presentation group. For example, various graphic symbols may flash or include some type of animation. Furthermore, some forms of the invention may show the symbol locations in some configuration other than a triangle. It will be appreciated that although the example graphic display shown in FIGS. 4, 6, and 7 is well suited for implementation in a video format with a player station such as 100 shown in FIGS. 1 and 2, this preferred game presentation may be implemented with a mechanical reel gaming machine with ten reels placed in the triangular arrangement. Also, numerous variations are possible in the playing rules of the game. For example, the implementation shown in FIGS. 4, 6, and 7 conducts the second symbol change procedure for only the symbol locations showing the target symbol after the first symbol change procedure. Other forms of the invention may cause each symbol location to conduct a second symbol change process in each game cycle. The invention is also not limited to only two symbol change processes per symbol location. Other implementations may use more than two symbol change procedures.

As used herein, whether in the above description or the following claims, the terms "comprising," "including," "carrying," "having," "containing," "involving," and the like are to be understood to be open-ended, that is, to mean including but not limited to. Use of ordinal terms such as "first," "second," "third," etc., in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements.

The above described preferred embodiments are intended to illustrate the principles of the invention, but not to limit the scope of the invention. Various other embodiments and modifications to these preferred embodiments may be made by those skilled in the art without departing from the scope of the present invention.

The invention claimed is:

1. A method for conducting a wagering game on an electronic player station, the method including:

(a) responsive to a player input, displaying a first subset of game symbols in a symbol arrangement including a number of individual symbol locations, the first subset of game symbols being displayed on an electronic display system associated with the electronic player station, and being selected from a set of potential game symbols including a target symbol;

(b) awarding a symbol pattern award for any symbol pattern included in the first subset of game symbols which is defined as an award-winning pattern in a paytable of symbol patterns for the wagering game;

(c) if the first subset of game symbols does not include the target symbol, awarding a first award based on the absence of the target symbol, the first award being separate from the symbol pattern award;

(d) if the first subset of game symbols includes the target symbol, replacing the first subset of game symbols to display a second subset of game symbols in the symbol arrangement, the second subset of game symbols being selected from the set of potential game symbols; and (e) if the second subset of game symbols does not include the target symbol, awarding a second award based on the absence of the target symbol, the second award being separate from the symbol pattern award and having a value different from a value of the first award.

2. The method of claim 1 further including concluding the wagering game responsive to the award of the first award.

3. The method of claim 1 wherein the electronic display system includes a video display device for displaying the symbol arrangement.

4. The method of claim 1 further including in addition to the second award, awarding an additional symbol pattern award for each symbol pattern included in the second subset of game symbols which is defined as an award-winning pattern in the paytable of symbol patterns.

5. The method of claim 4 wherein the step of awarding the additional symbol pattern award includes awarding the additional symbol pattern award in proportion to the amount of a wager by a player.

6. The method of claim 1 further including, prior to displaying the first subset of game symbols, initializing the game by displaying the target symbol at one or more symbol locations of the symbol arrangement.

7. The method of claim 6 wherein the step of initializing the game includes displaying the target symbol at each symbol location of the symbol arrangement.

8. The method of claim 1 wherein the step of awarding the additional symbol pattern award includes awarding the additional symbol pattern award in proportion to the amount of a wager by a player.

9. The method of claim 1 wherein the step of replacing the first subset of game symbols to display the second subset of game symbols in the symbol arrangement includes retaining any game symbol from the first subset that does not comprise the target symbol.

10. A gaming machine including:

(a) a display system;

(b) a player input system;

(c) at least one processor; and (d) at least one memory device storing instructions executable by the at least one processor to:

(i) responsive to a player input entered through the player input system, causing the display system to display a first subset of game symbols in a symbol arrangement including a number of individual symbol locations, the first subset of game symbols being selected from a set of potential game symbols including a target symbol;

(ii) cause the gaming machine to award a symbol pattern award for each symbol pattern included in the first subset of game symbols which is defined as an award-winning pattern in a paytable of symbol patterns for a wagering game;

(iii) if the first subset of game symbols does not include the target symbol, cause the gaming machine to award a first award based on the absence of the target symbol, the first award being separate from the symbol pattern award;

(iv) if the first subset of game symbols includes the target symbol, cause the display system to replace the first subset of game symbols to display a second subset of game symbols in the symbol arrangement, the second subset of game symbols being selected from the set of potential game symbols; and (v) if the second subset of game symbols does not include the target symbol, cause the gaming machine to award a second award based on the absence of the target symbol, the second award being separate from the symbol pattern award and having a value different from a value of the first award.

11. The gaming machine of claim 10 wherein the instructions are also executable to cause the gaming machine to conclude the wagering game responsive to the award of the first award.

12. The gaming machine of claim 10 wherein the display system includes a video display device adapted to display the symbol arrangement.

13. The gaming machine of claim 10 wherein the instructions are also executable to, prior to displaying the first subset of game symbols, initialize the game by causing the display system to display the target symbol at one or more symbol locations of the symbol arrangement.

14. The gaming machine of claim 13 wherein the instructions are also executable to initialize the game by causing the display system to display the target symbol at each symbol location of the symbol arrangement.

15. The gaming machine of claim 10 wherein the instructions are also executable to cause the display system to replace the first subset of game symbols to display the second subset of game symbols in the symbol arrangement so as to retain any game symbol from the first subset that does not comprise the target symbol.

16. A program product stored on one or more tangible computer readable data storage devices, the program product including:

(a) player input program code executable by at least one processor to receive a game play input entered through a gaming machine for a wagering game and an additional player input entered through the gaming machine for the wagering game;

(b) display program code executable by the at least one processor to, (i) responsive to the game play input, cause a display system to display a first subset of game symbols in a symbol arrangement including a number of individual symbol locations, the first subset of game symbols being selected from a set of potential game symbols including a target symbol, and (ii) if the first subset of game symbols includes the target symbol and responsive to the additional player input, cause the display system to replace the first subset of game symbols to display a second subset of game symbols in the symbol arrangement, the second subset of game symbols being selected from the set of potential game symbols; and (c) award program code executable by the at least one processor to (i) cause the gaming machine to award a symbol pattern award for each symbol pattern included in the first subset of game symbols which is defined as an award-winning pattern in a paytable of symbol patterns for the wagering game, (ii) if the first subset of game symbols does not include the target symbol, cause the gaming machine to award a first award based on the absence of the target symbol, the first award being separate from the symbol pattern award, and (iii) if the second subset of game symbols does not include the target symbol, cause the gaming machine to award a second award based on the absence of the target symbol, the second award being separate from the symbol pattern award and having a value different from a value of the first award.

17. The program product of claim 16 wherein the display program code is also executable to cause the gaming machine to conclude the wagering game responsive to the award of the first award.

18. The program product of claim 16 wherein the display program code is also executable to, prior to the display of the first subset of game symbols, initialize the wagering game by causing the display system to display the target symbol at one or more symbol locations of the symbol arrangement.

19. The program product of claim 18 wherein the display program code is also executable to initialize the game by causing the display system to display the target symbol at each symbol location of the symbol arrangement.

20. The program product of claim 16 wherein the display program code is also executable to cause the display system to replace the first subset of game symbols to display the second subset of game symbols in the symbol arrangement so as to retain any game symbol from the first subset that does not comprise the target symbol.

* * * * *